United States Patent [19]

Sullivan

[11] Patent Number: 4,516,749

[45] Date of Patent: May 14, 1985

[54] MECHANICAL STABILIZER

[76] Inventor: William B. Sullivan, 1609 E. Butler Dr., Phoenix, Ariz. 85020

[21] Appl. No.: 492,204

[22] Filed: May 6, 1983

[51] Int. Cl.³ ............................................. F16L 5/00
[52] U.S. Cl. .................................... 248/56; 248/345; 403/197; 285/158
[58] Field of Search ................. 248/343, 345, 56, 57; 403/194, 197, 287; 285/158; 174/65 R, 61, 64

[56] References Cited

U.S. PATENT DOCUMENTS

| | | | |
|---|---|---|---|
| 983,701 | 2/1911 | Gardiner | 248/345 |
| 1,224,297 | 5/1917 | Glauber | 285/158 |
| 1,491,873 | 4/1924 | McMurtrie | 403/194 |
| 1,841,727 | 1/1932 | Glowacki | 248/345 |
| 2,170,393 | 8/1939 | Tornblom | 285/158 |
| 3,430,990 | 3/1969 | Nelson | 285/158 |

Primary Examiner—William H. Schultz
Assistant Examiner—Robert A. Olson
Attorney, Agent, or Firm—Gregory J. Nelson

[57] ABSTRACT

A mechanical stabilizing device for stabilizing a shaft, pipe or similar fixture member. The device comprises a two-part unit slidable along the pipe or shaft. The upper part consists of a canopy housing with an internal female threaded portion. The lower part consists of a male threaded portion with a hex nut adapter which receives set screws. The upper bell housing is moved along the shaft and pushed against the wall or ceiling and the lower adapter portion screwed into the threaded portion of the canopy. The lower adapter portion is then secured to the shaft by the set screws. The upper bell can be upwardly tightened so that the ceiling flange portion of the bell exerts a force against the ceiling. Once tightened, the set screws in the bell can be secured to the shaft and the entire assembly consisting of the canopy, vertical shaft and lower adapter portion are unitized to reduce wobble and application of lateral loads.

6 Claims, 5 Drawing Figures

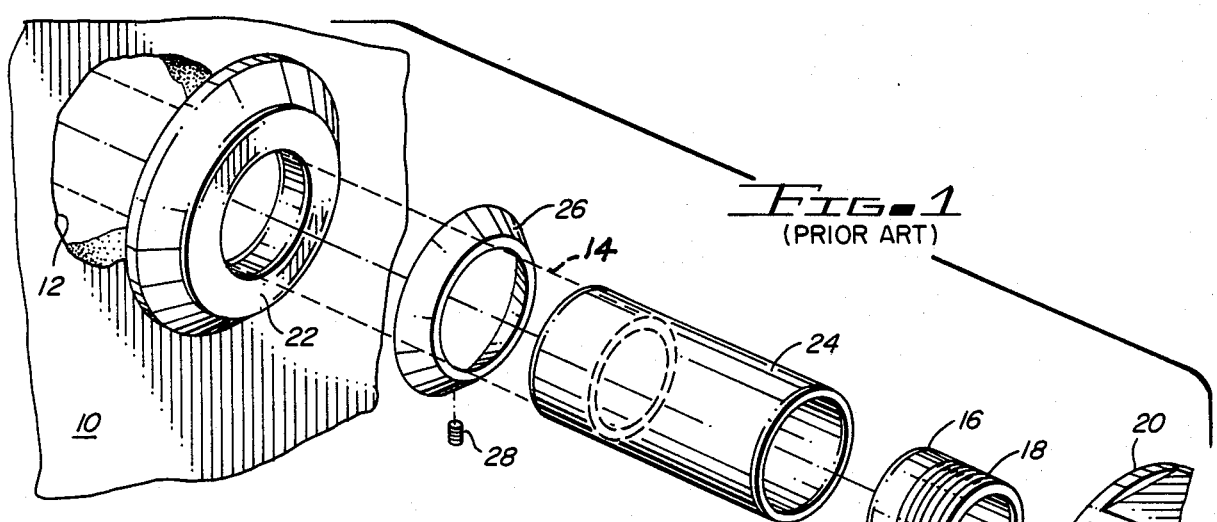
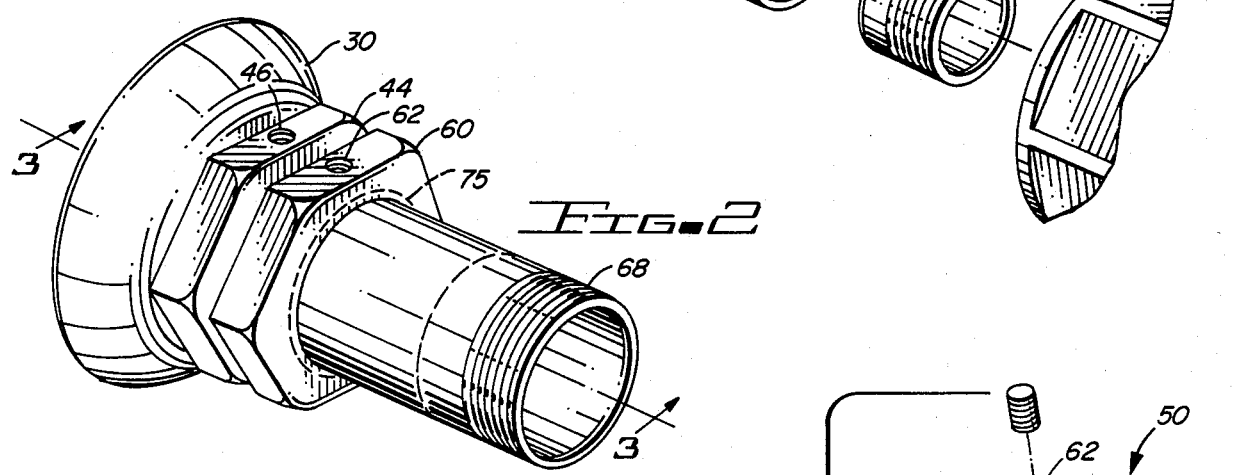
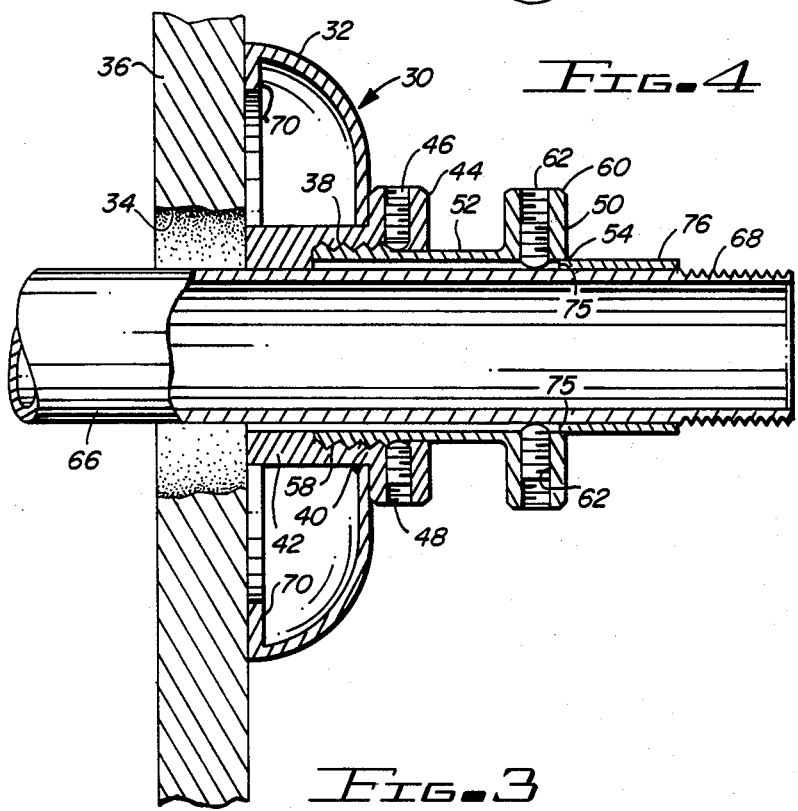
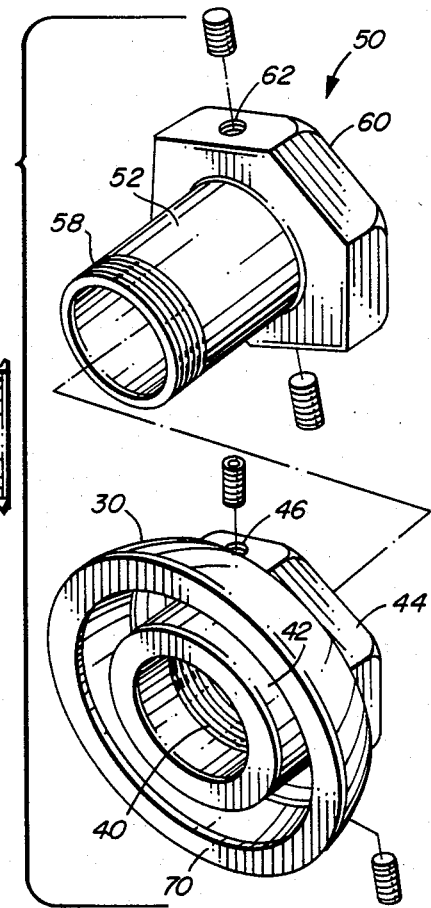

MECHANICAL STABILIZER

The present invention relates to a mechanical stabilizer and more particularly relates to a device for securing stabilizing shafts and pipes and similar mechanical components when they extend through an opening in a structural member.

The mounting of many electrical and mechanical components involves either attaching or suspending the component to a pipe or shaft extending through a wall or other structural element. For example, in the installation of ceiling fans, normally the fan motor unit is secured above the ceiling at a rafter or similar structural member. The shaft is then extended downwardly through an opening in the ceiling, often a substantial difference, terminating at the fan blade assembly. Because of variations in mounting, misalignment and imbalance in the fan blade assembly, the fan blade assembly often tends to wobble or shake. This vibrational movement is objectionable and may result in the apparatus eventually working loose from its mounting. Various approaches to solving this problem can be found in the prior art. For example, U.S. Pat. Nos. 2,051,205 and 2,174,747 both suggest employment of cushioning in the mechanical insulating members formed of rubber or other resilient material to dampen out wobble and movement.

Other devices utilize mechanical fastening systems. For example, U.S. Pat. No. 1,841,727 shows a fixture support which has a screw stem which is threaded into an internally threaded shank so the screw stem can be moved upwardly. The screw stem is raised until the upper end of the canopy or bell is moved into contact with the ceiling. Thereafter, the screw stem may be rotated causing large threaded section to thread through the internally threaded shank of the stem to hold the parts in a supported position. After the fixture has been mounted in place, a lock screw can be tightened.

While the above approaches to securing fans and similar mechanical contrivances can be found in the prior art, they generally have not found wide acceptance. Either they are difficult to install or simply do not do the job adequately.

In addition to the securement problem encountered with fan assemblies in which a blade assembly is secured on a long shaft, other situations in mechanical construction are found which similarly require some type of securement as where a shaft or pipe extends through the wall. A typical situation is in the plumbing field where a pipe or tubing member extends through a broken away section in the wall. This is common where a plumbing fixture such as shower heads are installed and also in commercial installations where flush valves for sink or toilet service are installed. The commercial situation poses a particular problem since this type of equipment is often subject to abuse. In conventional installations, the supply pipe is simply extended through an enlarged opening in the wall and the opening covered with an escutcheon plate. The pipe is left free to wobble within the opening and eventually a portion of the assembly can be broken or damaged. Further, unless the pipe is initially secured, many building inspectors and city codes will not pass such construction.

Therefore, there exists a clear need in the art for a device for efficiently securing and stabilizing pipes, shafts and other mechanical components which extend through a wall or ceiling in which an opening has been provided.

Briefly, the stabilizer system of the present invention includes a housing or canopy member with an internally threaded female member at one end. A portion of the housing is configured as a hex nut so a mechanical device such as a wrench may be applied to turn the housing. In addition, set screw openings are provided extending into the female threaded section. A lower adapter nut section consists of a male threaded portion with an external nut surface which is also configured to receive set screws such as Allen head screws. Both components are slidable along the shaft or the pipe to be secured. Once the shaft or pipe is in place, the upper housing can be placed against the ceiling or wall and the lower male adapter screwed into the bell. The lower male adapter is then secured to the shaft or pipe by a set screw. The upper housing or canopy is then tightened so that the flange portion exerts a force against the wall or ceiling. Once tightened, the set screws in the housing are secured and the entire assembly consisting of the housing, shaft and lower male adapter are unitized to reduce movement.

The invention will be more fully understood from the following description, claims and drawings in which:

FIG. 1 is an exploded view illustrating the prior art method of installing a plumbing fixture such as flush valves for sinks and other plumbing applications;

FIG. 2 is a perspective view of the stabilizer of the present invention in an assembled position;

FIG. 3 is a sectional view taken along lines 3—3 of FIG. 2;

FIG. 4 is an exploded perspective view showing the male and female adapter members.

Figure 5:
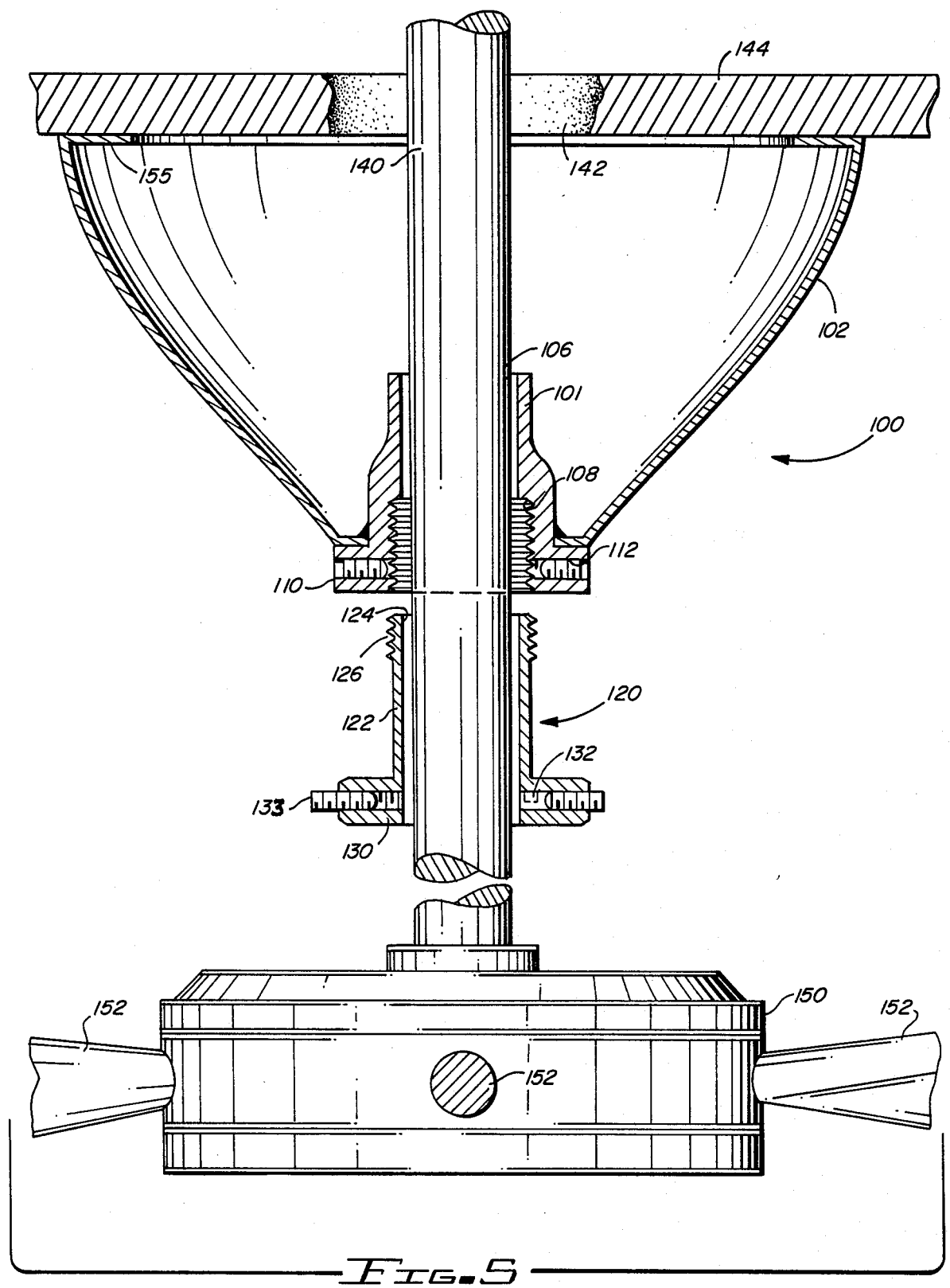
FIG. 5 is a sectional view showing the stabilizer of the present invention as applied to the installation of a ceiling fan.

Turning now to the drawings, FIG. 1 is a prior art illustration showing conventional installation of a plumbing fixture such as a flush valve. A flush valve is a common plumbing fixture which is used in connection with sinks and other types of plumbing applications. In the installation of such devices, an opening 12 is usually made in a wall 10 or other structural member which is somewhat larger than the stubbed-off pipe 14 which extends through the opening 12. Pipe 14 is cut-off and extends a distance from the finished wall 10. A threaded adapter member 16 is then secured to the outer end of pipe 14 at the desired location by sweat soldering or similar means. The outer end of the adapter 16 is provided with a threads 18 which engage with the control stop member 20 on the flush valve or other plumbing fixture. Once the adapter 16 is in place, an annular wall flange 22 can be slipped about the pipe 14 and engaged with the finished wall 10. Flange 22 is of sufficient diameter to cover the enlarged opening 12. In order to improve the appearance of the completed assembly, a sleeve 24 of chrome, steel or similar material may be placed about the pipe 14 with the inner end of the sleeve 24 engaged at the bore in the coverplate 22. An additional escutcheon plate 26 may be secured about the inner end of the sleeve 24 with appropriate set screw 28. The completed assembly can then be attached to the control stop 20 at threads 18. It will be appreciated that since opening 12 is somewhat larger than the diameter of the supply pipe 14, lateral force applied to the assembly may cause the entire assembly to wobble and eventually cause a break or damage to the system.

The present invention provides an improved stabilizing assembly for securement of plumbing fixtures such as has been described with reference to FIG. 1. Referring now to FIGS. 2 through 4, the improved assembly of the present invention includes a canopy member 30 having a generally semi-circular or bell-shaped housing 32. The diameter of the housing is selected to have sufficient diameter to extend beyond the size of opening 34 in the finished wall, ceiling or floor member 36. Integrally formed as part of the housing 32 at the axial centerline of the body is female adapter member 38. Internal threads 40 are provided in axially extending boss 42. A hexagonal nut member 44 is integrally formed at the lower end of the boss. One or more bores 46 extend radially through the hexagonal nut 44 into the area defined by threads 40. In this way one or more set screws or Allen head screws can be radially positioned against male adapter 50.

The male adapter component 50 has an elongate body 52 defining an axially extending bore 54 for receipt of the shaft or pipe. The outer end of the body is provided with male threads at 58 which are adapted to be engaged in the threads at the end of the canopy 30. The male adapter is provided with a hexagonal nut section 60 for securement of a wrench or similar mechanical device. One or more radially extending bores 62 are adapted to receive Allen head or set screws.

The mechanical stabilizer device shown in FIGS. 2 and 4 will be more fully understood from the following description of installation. The wall, floor or ceiling member 36 is broken away at 34 and a large hole to accomodate supply pipe 66. Pipe 66 extends through the wall a sufficient distance and connects at thread 68 to suitable plumbing fixture such as a control stop, shower head or other fixture not shown. In the installation, once the supply pipe 66 is extended through the opening and is stubbed-off with threaded adapter secured at 68, canopy 30 can be axially slid over the supply pipe 66. The adapter 30 is positioned with the inner flanged edge 70 tightly engaging the finished wall surface. Thereafter, the male adapter member 50 is engaged about the supply pipe at bore 54 and axially moved until the male threads 40 are in engagement with the internal female threads 38 of the canopy. The lower male portion can then be rotated by hand or wrench until the threads are in snug engagement. Thereafter, set screws extending in bore 62 in the male adapter member are tightened against the supply shaft 66. Thus, the lower male member and the shaft are an integral unit. Thereafter, the upper canopy member can further be tightened by application of torque at the hexagonal nut section 44. The upper canopy is tightened so that the flange portion 70 exerts a force against the ceiling or wall 36. Once tightened, the set screws placed in the bores 46 are tightened and the entire assembly consisting of the canopy, pipe and lower male adapter portion are then unitized to resist wobble and application of any radial forces to the supply pipe. For improved appearance, the entire assembly including the bell and male and female members can be chrome plated or otherwise finished. In addition, a portion of the male hexagonal nut member 60 can be undercut at 75 to accomodate a sleeve or tubing member 76 which can be placed about the supply pipe to provide an entire exterior surface of chrome steel.

In addition to the plumbing applications above, the mechanical stabilizing device of the present invention has substantial other applications. For example, the device can be used in any situation where a pipe, tube or similar member extends through an opening in a wall, floor or ceiling member or where it is desired to secure a pipe or shaft between two spaced-apart structural members. For example, the device would have application to stabilizing the leg of a furniture member. The device can also have application to securely tightening a bar or shaft member between two walls as in the case of a hanger rod, chin-up bar or similar application.

As a further example of the versatility and uniqueness of the present device, reference is made to FIG. 5 which shows an alternate embodiment which is generally designated by the numeral 100 which has specific application to the securement of a ceiling fan member. Device 100 again includes a body member 102 which is shown as being a generally bell canopy shaped and may have an outer finish which is brass plated or similarly finished to give the desired appearance. Body 102 is provided with an integrally formed axial hub or boss 101 which defines an internal bore 106. The lower end of bore 106 is provided with female threads at 108. A nut section 110 is provided at the lower end of the canopy has flattened faces to receive a wrench or other mechanical device. A plurality of transverse or radially extending bores 112 are provided in the faces of nut 110 to receive set screws.

The male adapter member 120 has an axially extending body member 122 which defines an internal bore 124. The upper end of body member 122 is provided with external or male threads 126 which are adapted to be received in mating engagement with threads 108. The lower end of the adapter member is provided with nut section 130 having flattened faces for receipt of a wrench or similar tool. Again, radial bores 132 are provided in the nut section for receipt of set screws 133. In an installed position, the vertically extending fan shaft 140 extends through an opening 142 in the ceiling 144. The fan mounting assembly, including brackets and other mounting components are not shown but are secured to overhead rafter or beam member as is conventional. The downwardly extending vertical shaft may extend a substantial distance into the room terminating at a fan head 150 which may include a motor, has a plurality of radially extending fan blades 152. In normal installation, the fan blades are often subject to considerable wobble due to misalignment, imbalance of the fan assembly 150 or general misalignment of the components. With the present invention, once the fan shaft 140 is installed in place, the canopy 102 is axially moved along shaft 140 until the circular flange surface 155 of the canopy tightly engages the interior finished wall. Male member 120 is axially slid along the fan shaft 140 until threads 126 engage threads 108 of the upper member. Male adapter member is turned until threaded engagement is snug. Set screws 133 extending radially in bores 132 are tightened to engage the vertical shaft 140. Thereafter, a wrench or other tool can be applied to the surfaces 110 of the bell and the canopy further advanced and tightened against the ceiling 144. When the canopy is tightened to the desired position, additional set screws extending in bores 112 can be secured in place bearing against the shaft 140. It will be appreciated that the entire assembly consisting of the shaft, male adapter, canopy are now unitized with any lateral movement or wobble of the shaft resisted at the engagement of the flange 155 and the ceiling.

From the foregoing, it will be seen that the present invention provides a unique mechanical stabilizing device which has substantial applications. The device is easy to install and can be manufactured at economical cost. Further, the device can be variously configured to have a surface appearance which is aesthetically acceptable to the particular application.

It will be obvious to those skilled in the art to make various changes, alterations and modifications to the mechanical stabilizing device of the present invention. To the extent those changes, alterations and modifications do not depart from the spirit and scope of the appended claims, they are intended to be encompassed therein.

I claim:

1. A stabilizer for securing a generally cylindrical member at one side of a surface generally perpendicular with respect to said cylindrical member and attachable from one side of said surface, said stabilizer comprising:
   (a) a canopy having a hub with first and second ends, said hub defining a generally axial bore and first adjustment means associated with said bore at said first end, the said canopy extending radially outward and terminating at a location in substantially the same plane as the terminus of the hub at said second end to provide a bearing surface;
   (b) an adapter having a body defining a generally axial bore and axially slidable along said member, said adapter having second adjustment means adapted to engage said first adjustment means of said canopy;
   (c) first securement means associated with said canopy; and
   (d) second securement means associated with said adapter whereby the canopy and adapter are slidable about said cylindrical member at said first side and engageable at said first and second adjustment means with the second end of said canopy engaging said surface with said second securement means engaging said member and thereafter permitting said canopy to be adjusted to the desired position relative to said member and surface and secured in said position at said first securement means.

2. The stabilizer of claim 1 wherein said first adjustment means comprises internal threads and said second adjustment means comprises cooperable external threads.

3. The stabilizer of claim 2 wherein said first and second securement means comprise set screws extending transversely in said canopy and adapter respectively.

4. The stabilizer of claim 3 further including a nut surface associated with each of said canopy and adapter.

5. The stabilizer of claim 4 wherein said canopy is generally bell shaped.

6. A method of securing a generally cylindrical member at one side of a surface which surface is generally perpendicular with respect to the said cylindrical member, said method comprising:
   (a) providing a canopy having a hub with first and second ends, said hub defining a generally axial bore and having first adjustment means associated with said bore at said first end, said canopy extending radially outward and terminating at a location in substantially the same plane as the terminus of the hub at said second end to provide a bearing surface, said canopy further including first securement means;
   (b) providing an adapter having a body defining a generally axial bore, said adapter having second adjustment means adapted to engage the first adjustment means of said canopy, said adapter further including second securement means;
   (c) sliding said canopy hub about said member to engage said second end with said surface;
   (d) engaging said adapter with said canopy at said first and second adjustment means;
   (e) engaging said second securement means at said member;
   (f) adjusting the canopy to the desired position relative to said member and surface; and
   (g) securing said canopy to said adapter at said first securement means.

* * * * *